INVENTOR.
JOSEPH R. BOURNE.

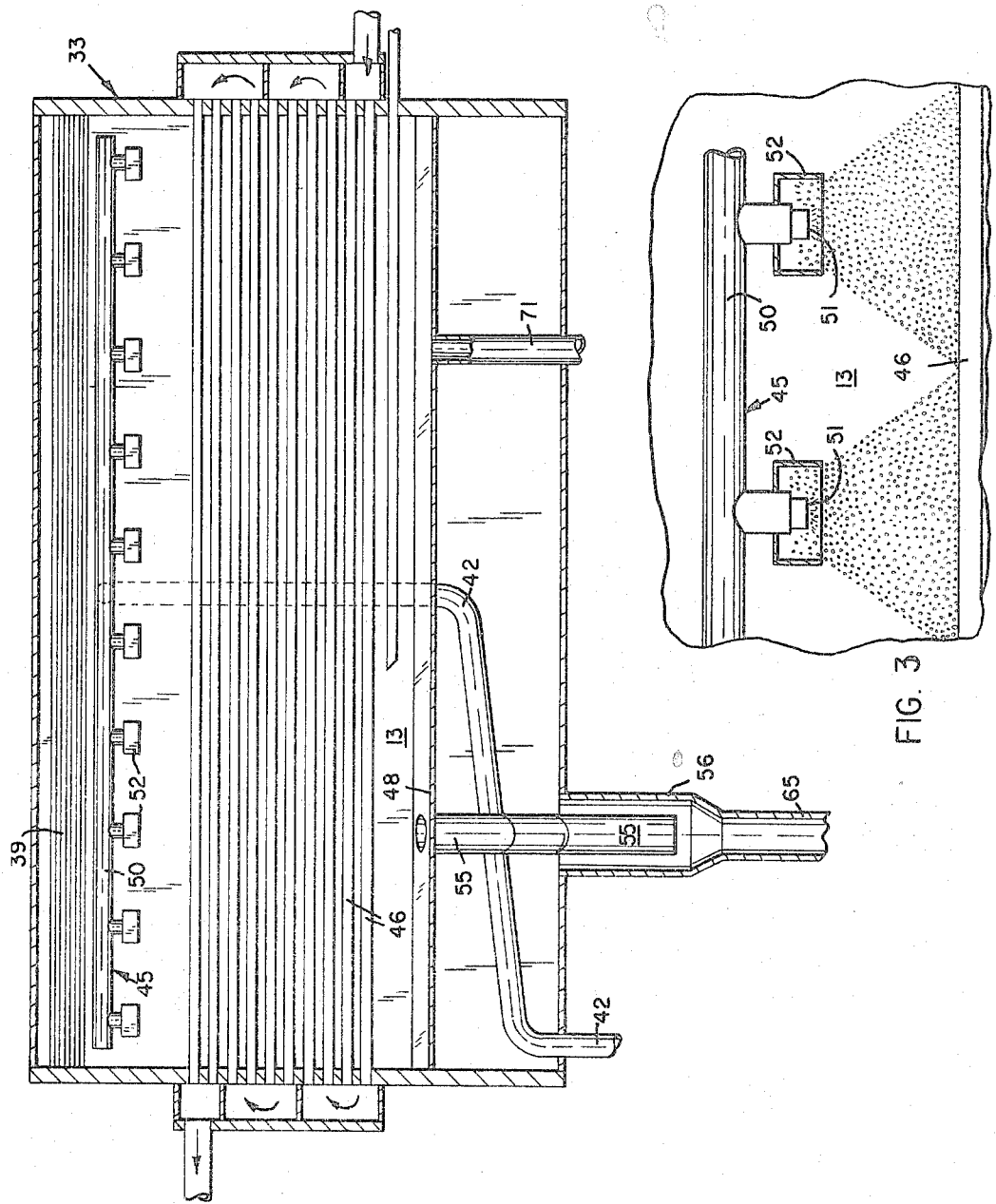

United States Patent Office 3,289,427
Patented Dec. 6, 1966

3,289,427
ABSORPTION REFRIGERATION SYSTEMS AND METHOD OF OPERATION PROVIDING IMPROVED SOLUTION DISTRIBUTION OVER THE TUBES OF THE ABSORBER
Joseph R. Bourne, Dewitt, N.Y., assignor to Carrier Corporation, Syracuse, N.Y., a corporation of Delaware
Filed Apr. 1, 1965, Ser. No. 444,526
7 Claims. (Cl. 62—101)

This invention relates to absorption refrigeration and, more particularly, to an absorption refrigeration system and method of operation embodying improved solution distribution over the absorber tube bundle.

The chief object of the present invention is to provide an absorption refrigeration system and method of operation providing improved solution distribution over the tubes of the absorber.

An object is to provide an absorption refrigeration system including solution distributing means which permit adiabatic expansion of solution to saturated condition as it is discharged in the absorber to cool the solution thereby creating a substantial volume of vapor which may be utilized to distribute the strong solution in droplets uniformly over the tube bundle of the absorber.

A further object is to provide a method of distributing strong solution over the tube bundle of the absorber of an absorption refrigeration system by utilizing the internal kinetic energy of the solution as it enters the absorber to distribute the solution in droplets substantially uniformly over the tube bundle. Other objects of the invention will be readily perceived from the following description.

This invention relates to an absorption refrigeration system. The absorption refrigeration system includes a generator comprising a zone of higher pressure, a condenser, an evaporator, and an absorber comprising a zone of lower pressure. The absorber includes a plurality of heat exchange tubes for cooling an absorbent solution. Means are provided to forward weak solution from the absorber to the generator. Means are provided to forward strong solution from the generator to the absorber at a pressure greater than absorber pressure. The system also includes a heat exchanger for placing strong solution and weak solution in heat exchange relation. Means are provided in the absorber for distributing strong solution over the exterior surfaces of the tubes. Refrigerant vapor from the evaporator passes to the absorber to be absorbed in the region of the tubes. The strong solution distributing means comprises a header and means connected to the header to adiabatically expand strong solution into the zone of lower pressure to cool the strong solution and to create vapor in a volume sufficient to distribute the cooled solution in droplets substantially uniformly over the tube bundle.

This invention further relates to a method of distributing strong solution over a tube bundle in a region of lower pressure in an absorption refrigeration system employing a salt solution as an absorbent and a liquid compatible therewith as a refrigerant. Strong solution is forwarded from a region of higher pressure in the system to the region of lower pressure, the strong solution being at a pressure greater than pressure in the region of lower pressure. Refrigerant vapor to be absorbed is admitted in the region of the tube bundle. A cooling medium is passed through the tubes of the tube bundle to cool solution passing over the exterior surfaces of the tubes. The strong solution is adiabatically expanded to saturated condition as it enters the region of lower pressure to cool the strong solution and to create a substantial volume of vapor. The vapor as it is created is utilized to distribute the cooled solution in droplets substantially uniformly over the tube bundle.

The attached drawings illustrate a preferred embodiment of the invention, in which:

FIGURE 2 is a sectional view of the absorber included in the system of FIGURE 1; and FIGURE 3 is a fragmentary, sectional view of the solution distribution means employed in the absorber of the system.

Figure 1:
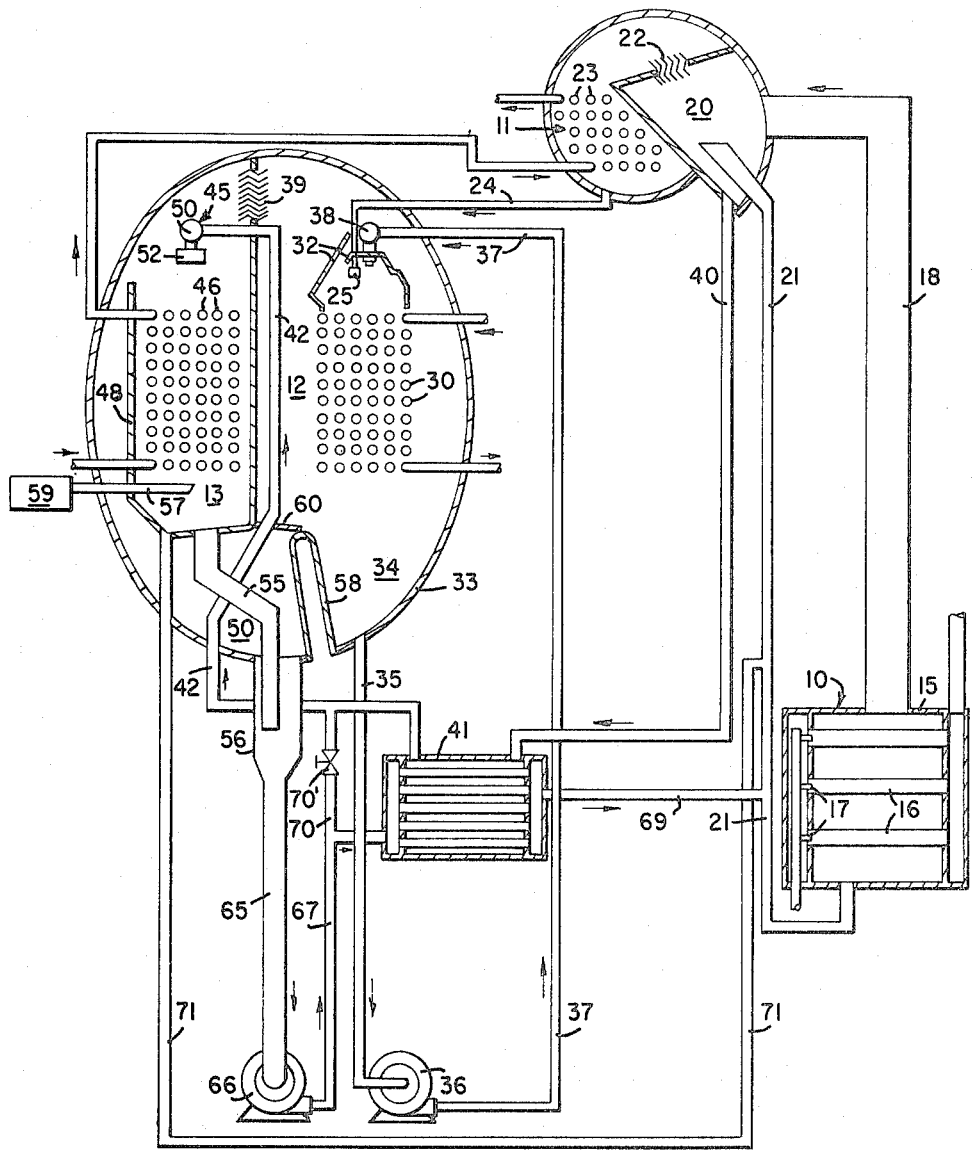
FIGURE 1 is a diagrammatic view of an absorption refrigeration system embodying the present invention.

The absorption refrigeration system of the present invention may employ water as the refrigerant and a solution of lithium bromide as the absorbent solution. As used herein, the term "strong solution" refers to a concentrated solution of lithium bromide, which is strong in absorbing power; the term "weak solution" refers to a dilute solution of lithium bromide, which is weak in absorbing power. An additive, such as 2-ethyl-n-hexanol, and a suitable corrosion inhibitor may also be employed, if desired.

Referring to the drawings, there is shown, in FIGURE 1, an absorption refrigeration machine having a generator section 10 constituting a zone of higher pressure, a condenser section 11, an evaporator section 12, and an absorber section 13 forming a zone of lower pressure, interconnected to provide refrigeration. The evaporator and absorber sections may be placed within a single shell; it will be appreciated that other configurations may be employed.

Generator section 10 comprises a shell 15 having a plurality of fire tubes 16 passing therethrough. Gas jets 17 supply an ignited mixture of gas and air into fire tubes 16 to heat weak solution which is supplied to the generator. A vapor lift tube 18 extends from the top of shell 15. Weak solution is heated in generator section 10 to boil off refrigerant vapor thereby concentrating the weak solution. A mixture of concentrated absorbent solution and refrigerant bubbles rises upwardly through vapor lift tube 18 and passes into separator chamber 20. Equalizer line 21, connecting the bottom of generator 10 and separator 20, serves as an overflow under some conditions and assists in stabilizing the generator boiling.

Condenser section 11 may be contained in the same shell as separator 20 and comprises a plurality of heat exchange tubes 23. A cooling medium from a suitable source, such as a cooling tower, passes through condenser tubes 23. Refrigerant vapor separates from the mixture of absorbent solution passed to separator chamber 20 and passes to condenser section 11 through eliminators 22. The refrigerant vapor is condensed to liquid refrigerant in condenser section 11. Liquid refrigerant passes from condenser section 11 through condensate line 24 to spray nozzles 25 in evaporator section 12.

Evaporator section 12 comprises a plurality of heat exchange tubes 30 disposed in a tube bundle located in a portion of shell 33. Water or other heat exchange fluid to be cooled is passed through evaporator tubes 30 in heat exchange with refrigerant supplied over the exterior surfaces thereof. Heat is absorbed from the water to be cooled by the refrigerant, thereby cooling the water in evaporator tubes 30 and vaporizing refrigerant on their exterior surfaces. The vaporized refrigerant passes from evaporator section 12 into absorber section 13 carrying with it the heat absorbed from the water passing through tubes 30. The chilled water may be circulated to any suitable place of use.

Baffles 32 are provided in evaporator section 12 to direct refrigerant vapor from the spray nozzles onto the tube bundle in the evaporator section.

Shell 33 includes an evaporator sump 34 containing unevaporated refrigerant liquid which drips off the lower rows of evaporator tubes 30. A refrigerant recirculation line 35 connects pump 36 with sump 34. Pump 36 supplies refrigerant through recirculation line 37 to spray nozzles 38 where it is again discharged over the top of the tube bundle in the evaporator section.

Refrigerant vapor separates from absorbent solution in separation chamber 20. The concentrated absorbent solution, or strong solution, passes from the lower portion of chamber 20 through strong solution line 40, through one side of heat exchanger 41, through strong solution line 42 to liquid distribution means 45 in the absorber and is discharged therein to wet absorber tubes 46.

Absorber section 13 may be contained in shell 33 and comprises a plurality of heat exchange tubes 46 disposed in a tube bundle and arranged in rows as previously described with respect to the heat exchange tubes in evaporator section 12. Cooling water from a suitable source, such as a cooling tower, is passed through heat exchange tubes 46 to cool the absorbent solution sprayed on their exterior surfaces. The cooling water may be circuited so as to flow from absorber heat exchange tubes 46, through condenser tubes 23 to a cooling tower (not shown) where the cooling water is recooled and returned to the absorber tubes.

An absorber pan 48 is arranged around the sides and bottom of the tube bundle in the absorber section to separate absorber section 13 from evaporator section 12. Eliminators 39 may be provided in the vapor path between the absorber and evaporator sections.

As previously stated, generator 10 forms a zone of higher pressure than absorber 13. Since separator 20 is in communication with generator 10, it is at approximately the same pressure and may in effect be deemed a part of the generator. Hot strong solution from separator 20 flows through line 40 to heat exchanger 41 where its temperature and pressure may be substantially reduced although the solution is superheated with respect to absorber pressure; in other words, pressure of solution is greater than absorber pressure which constitutes a zone of lower pressure.

Strong solution passes from the heat exchanger through line 42 to absorber liquid distribution means 45. Distribution means 45 includes a header 50 having a series of spaced spray nozzles 51 through which the strong solution is discharged into the region of lower pressure constituting the absorber 13. Deflectors 52 are placed about the nozzles 51, for a purpose hereinafter explained.

As the strong solution passing through the nozzles 51 is exposed to the zone of lower pressure, it immediately becomes superheated and undergoes adiabatic expansion thus cooling the solution in the form of droplets to saturated condition. The adiabatic expansion undergone by the solution creates immediately during the process a large amount of vapor, the vapor being utilized to distribute the cooled solution droplets substantially uniformly over the absorber tube bundle. In other words, the internal kinetic energy of the superheated strong solution is utilized to cool the solution in the form of droplets and the rapid, sudden expansion of the vapor simultaneously created is utilized to distribute the droplets over the tube bundle. It will be appreciated the expansion is so tremendous that without deflectors 52 some vapor carrying droplets of solution might be forced into the evaporator section 12 of shell 33.

An absorber discharge conduit 55 collects absorbent solution which drips from the absorber tubes and discharges it into outlet 56 of solution storage sump 50, which is formed in the lower portion of the absorber section of shell 33 by a partition 58.

A purge line 57 having an opening adjacent the lower portion of the tube bundle in absorber section 13 is connected to a suitable purge unit 59.

A baffle 60 is provided between absorber pan 48 and evaporator section 12 to prevent unwanted refrigerant draining into the absorber section. Absorbent solution is withdrawn from the absorber section through weak solution line 65 and passed by pump 66 through line 67 through the other side of heat exchanger 41 and line 69 to equalizer line 21 where it is forwarded to the generator section for reconcentration. A portion of the weak solution from pump 66, if desired, may be passed through weak solution recirculating line 70 having valve 70' therein so as to mix with concentrated absorbent solution in line 42 and recirculation through spray nozzles 45. This is desirable particularly when an additive such as 2-ethyl-n-hexanol is employed for it permits additive-laden solution to be supplied to the spray nozzles permitting a better spray pattern to be obtained and permits less superheat. Strong solution, generally speaking, is relatively additive-free. Thus, if flow from the generator is inadequate to wet the absorber tubes, additional solution may be forwarded to the absorber; while available superheat is thereby reduced, since flow from the generator is also reduced with an accompanying increase in superheat, adequate operation under these conditions may be maintained.

A solution loop line 71 is provided between equalizer line 21 in an appropriate height, and the lower portion of absorber pan 48. Line 71 serves to maintain the proper solution level in generator section 10 on startup.

Absorption refrigeration machines made in accordance with this invention have been found to produce significantly improved performance, for vastly improved distribution of solution over the absorber tube bundle has been achieved without substantial cost penalties.

The scouring action of the formed vapor prevents dirt from settling in the spray nozzles thus preventing clogging of the nozzles during operation. Distribution of solution in the tube bundle is not as sensitive to flow as in conventional methods of solution distribution.

While I have described a preferred embodiment of the invention, it will be understood that the invention is not limited thereto, since it may be otherwise embodied within the scope of the following claims.

I claim:

1. In an absorption refrigeration system, the combination of a generator comprising a zone of higher pressure, a condenser, an evaporator, an absorber comprising a zone of lower pressure, said absorber including a plurality of heat exchange tubes for cooling an absorbent solution, means to forward weak solution from the absorber to the generator, means to forward strong solution from the generator to the absorber, said solution being superheated with respect to absorber pressure, a heat exchanger for placing strong solution and weak solution in heat exchange relation, means for distributing strong solution over the exterior surfaces of the tubes, means for admitting refrigerant vapor to be absorbed in the region of said tubes, said strong solution distributing means comprising a header and means in communication with the header to adiabatically expand strong solution into the zone of lower pressure to cool the strong solution and to create vapor in a volume sufficient to distribute the cooled solution in droplets substantially uniformly over the tube bundle.

2. In an absorption refrigeration system, the combination of a generator comprising a zone of higher pressure, a condenser, an evaporator, an absorber comprising a zone of lower pressure, said absorber including a tube bundle comprising a plurality of heat exchange tubes for cooling an absorbent solution, means to forward weak solution from the absorber to the generator, means to forward strong solution from the generator to the absorber, said solution being superheated with respect to absorber pressure, a heat exchanger for placing strong solution and weak solution in heat exchange relation, means for distributing strong solution over the exterior surfaces of the tubes, means for admitting refrigerant vapor to be absorbed in the region of said tubes, said strong solution distributing means comprising a header connected to the strong solution forwarding means and a plurality of spray nozzles connected to the header to discharge strong solution in the lower pressure zone as it undergoes adiabatic expansion to saturated condition thereby cooling the solution and creating a substantial volume of vapor, the vapor as it is created distributing the cooled solution in droplets substantially uniformly over the tube bundle.

3. An absorption refrigeration system according to claim 2 in which deflectors are placed about the nozzles, the deflectors serving to prevent vapor carrying droplets of solution to the evaporator.

4. In a method of distributing strong solution over a tube bundle in a region of lower pressure in an absorption refrigeration system employing a salt solution as an absorbent and a liquid compatible therewith as a refrigerant the steps which consist in forwarding strong solution from a region of higher pressure in the system to the region of lower pressure, the strong solution being superheated with respect to pressure in the region of lower pressure, admitting refrigerant vapor to be absorbed in the region of the tube bundle, passing a cooling medium through the tubes of the tube bundle to cool solution passing over the exterior surfaces of the tubes, adiabatically expanding the strong solution to saturated condition as it enters the region of lower pressure to cool the strong solution and to create a substantial volume of vapor, and utilizing the vapor as it is created to distribute the cooled solution in droplets substantially uniformly over the tube bundle.

5. In a method of distributing strong solution over the tube bundle of the absorber of a refrigeration system employing a salt solution as an absorbent and a liquid compatible therewith as a refrigerant, the steps which consist in forwarding strong solution from the generator of the system to the absorber of the system, the strong solution being superheated with respect to absorber pressure, admitting refrigerant vapor to be absorbed in the region of the tube bundle, passing a cooling medium through the tubes of the tube bundle to cool solution passing over the exterior surfaces of the tubes, adiabatically expanding the strong solution as it enters the absorber to saturated condition to cool the strong solution and to create a substantial volume of vapor, and utilizing the vapor as it is created to distribute the cooled solution in droplets substantially uniformly over the tube bundle.

6. In a method of distributing strong solution over a tube bundle in a region of lower pressure in an absorption refrigeration system employing a salt solution as an absorbent and a liquid compatible therewith as a refrigerant, the steps which consist in forwarding strong solution from a region of higher pressure in a system to the region of lower pressure, the strong solution being superheating with respect to pressure in the region of lower pressure, admitting refrigerant vapor to be absorbed in the region of the tube bundle, passing a cooling medium through the tubes of the tube bundle to cool solution passing over the exterior surfaces of the tubes, discharging the strong solution in the zone of lower pressure, utilizing the internal kinetic energy of the solution as it enters the zone of lower pressure to cool the solution while simultaneously creating a substantial volume of vapor, and utilizing the vapor as it is created to distribute the cooled solution in droplets substantially uniformly over the tube bundle.

7. In a method of operation of an absorption refrigeration system including a generator forming a region of higher pressure, a condenser, an evaporator, an absorber forming a region of lower pressure and including a tube bundle for cooling absorbent solution, a heat exchanger to place strong solution and weak solution in heat exchange relation, and employing a liquid solution as an absorbent and a material compatible therewith as a refrigerant, the steps which consist in forwarding weak solution from the absorber to the generator, forwarding strong solution from the generator to the absorber, admitting refrigerant vapor to be absorbed in the region of the tube bundle, passing a cooling medium through the tubes of the tube bundle in heat exchange relation with solution passing over the exterior surfaces of the tubes, adiabatically expanding the strong solution as it enters the absorber to saturated condition to cool the strong solution and to create a substantial volume of vapor, and utilizing the vapor as it is created to distribute the cooled solution in droplets substantially uniformly over the tube bundle.

References Cited by the Examiner

UNITED STATES PATENTS

| | | | |
|---|---|---|---|
| 2,855,765 | 10/1958 | Smith et al. | 62—494 X |
| 2,959,931 | 11/1960 | Leonard | 62—494 X |
| 2,983,110 | 5/1961 | Leonard | 62—494 X |
| 3,126,720 | 3/1964 | Stubblefield | 62—494 X |

LLOYD L. KING, *Primary Examiner.*